(12) United States Patent
Patenotre

(10) Patent No.: US 6,820,537 B2
(45) Date of Patent: Nov. 23, 2004

(54) COOKING APPLIANCE WITH REMOVABLE COOKING PLATE BY LOCKING AND UNLOCKING DEVICE

(75) Inventor: Yves Patenotre, Desingy (FR)

(73) Assignee: SEB SA, Ecully (FR)

( * ) Notice: Subject to any disclaimer, the term of this patent is extended or adjusted under 35 U.S.C. 154(b) by 0 days.

(21) Appl. No.: 10/380,542

(22) PCT Filed: Sep. 7, 2001

(86) PCT No.: PCT/FR01/02793

§ 371 (c)(1),
(2), (4) Date: Oct. 6, 2003

(87) PCT Pub. No.: WO02/21985

PCT Pub. Date: Mar. 21, 2002

(65) Prior Publication Data

US 2004/0050256 A1 Mar. 18, 2004

(30) Foreign Application Priority Data

Sep. 15, 2000 (FR) .............................. 00 11808

(51) Int. Cl.⁷ .............................. A23L 1/00; A47J 37/00; A47J 37/08
(52) U.S. Cl. .............................. 99/331; 99/337; 99/349; 99/372; 99/378; 219/521; 219/525
(58) Field of Search .......................... 99/326–333, 339, 99/340, 372–384, 389, 400, 401, 426, 422–425, 444–450, 483; 219/450.1, 451.4, 521, 524, 468.1, 468.2, 544, 474, 525, 441, 442; 220/326, 912

(56) References Cited

U.S. PATENT DOCUMENTS

| | | | | |
|---|---|---|---|---|
| 2,427,451 A | * | 9/1947 | Ellestad .................. | 99/372 |
| 2,520,997 A | * | 9/1950 | Cavanagh ................ | 99/372 |
| 2,795,182 A | | 6/1957 | Gomersall ................ | 99/376 |
| 2,903,959 A | | 9/1959 | Wagner et al. .......... | 99/376 |
| 3,348,470 A | | 10/1967 | Swanson ................ | 99/331 |
| 3,746,837 A | | 7/1973 | Frey et al. ................ | 219/387 |
| 3,880,064 A | * | 4/1975 | Martinez ................ | 99/349 |
| 3,963,898 A | * | 6/1976 | Tuckwell ................ | 219/524 |
| 4,102,256 A | * | 7/1978 | John et al. .............. | 99/372 |
| 5,129,313 A | * | 7/1992 | Coppier .................. | 99/376 |
| 5,138,938 A | * | 8/1992 | McClean ................ | 99/331 |
| 5,363,748 A | * | 11/1994 | Boehm et al. .......... | 99/372 |
| 5,615,604 A | * | 4/1997 | Chenglin ................ | 99/332 |
| 6,427,581 B1 | * | 8/2002 | Wu .......................... | 99/332 |
| 6,429,409 B1 | * | 8/2002 | Siu .......................... | 219/450.1 |
| 6,439,108 B1 | * | 8/2002 | Wu .......................... | 99/349 |
| 6,487,963 B1 | * | 12/2002 | Wu .......................... | 99/340 |

FOREIGN PATENT DOCUMENTS

DE          86 25 495          1/1987

* cited by examiner

Primary Examiner—Timothy F. Simone
(74) Attorney, Agent, or Firm—Young & Thompson

(57) ABSTRACT

A cooking appliance comprising a shell (4) and a control knob (7) mobile relative to the shell (4) which comprises a heating element and bears a removable hot plate fixed on the heating element by at least one locking member (1) and releasable by moving the member (1). The appliance comprises a lever (8) forming a crank-shaft assembly pivoting about a pin (12) whereby it is fixed to the shell (4); one part of the lever (20) co-operates with the knob (7) and another part (19), drives the locking member (1) when the knob is stressed and acts on the lever (8).

10 Claims, 3 Drawing Sheets

COOKING APPLIANCE WITH REMOVABLE COOKING PLATE BY LOCKING AND UNLOCKING DEVICE

CROSS REFERENCE TO RELATED APPLICATION

This is the 35 USC 371 national stage of international application PCT/FR01/02793 filed Sep. 7, 2001, which designated the United States of America.

FIELD OF THE INVENTION

The present invention relates to cooking appliances having cooking plates or "hot plates" that are made removable by securing and releasing devices.

The technical sector of the invention is the field of "small household electrical appliances".

BACKGROUND OF THE INVENTION

The invention essentially applies to appliances of the grill, waffle-iron, or sandwich-toaster type. Such an appliance comprises two hot plates hinged together to define between them a space for receiving food to be cooked, each hot plate being heated by a respective electric heater element in contact with the plate.

Making such hot plates removable opens up possibilities for making multi-purpose appliances that can be transformed into sandwich toasters, waffle irons, or grills merely by changing the hot plates. For that purpose, the hot plates are held stationary inside shells by securing means that can be moved to release said plates and to interchange them. However, manipulating such means is impractical and inconvenient, and also involves the risk that the user might suffer burns. To mitigate that drawback, certain appliances are equipped with catch systems making them easier to use, but such systems are generally costly to make.

SUMMARY OF THE INVENTION

An object of the present invention is to mitigate the above-mentioned drawbacks by making it more practical to change the plates, with as few parts as possible, making it possible to reduce the manufacturing and assembly costs, while reducing the danger of burns.

This object is achieved with a cooking appliance comprising at least one shell, and at least one control button mounted to move relative to the shell, the shell incorporating a heater element and carrying a removable hot plate which is fixed to said heater element via at least one securing means, and which is releasable by moving said means. In the invention, the appliance further comprises at least one lever forming a crank-shaft assembly mounted to turn about an axis via which it is fixed to the shell, one portion of the lever co-operating with the control button and another portion driving the securing means when the control button is pushed and acts on the lever. The lever has a central body disposed along said axis, turning about said axis, and situated between the portions co-operating with the control button at one end, and driving the securing means constituted by a catch mounted to tilt about said axis at the other end.

In a preferred embodiment, the lever is a metal wire bent to constitute the portions co-operating with the control button at one end, and driving the catch at the other end, the two portions, together with the portion of the metal wire that interconnects them and that constitutes the central body of the lever, forming a crank-shaft assembly.

The result is a novel cooking appliance having hot plates that are made removable by a hot plate securing/releasing device which achieves the above-mentioned object by means of a sub-assembly made up of only three parts which correspond to a control button, a lever or a transmission, and a securing means for each plate, each securing means operating by means of a locking catch.

The control button, which is of ergonomic shape, is placed on the appliance so as to be practical to use, visible, and quite a long way away from the hot plates so as to avoid burns. It thus makes it possible to release the plates and to interchange them depending on the food that is to be prepared. The resulting cooking appliance is a multi-purpose appliance that can, for example, perform the functions of grills, waffle irons, sandwich toasters, etc.

BRIEF DESCRIPTION OF THE DRAWINGS

Other advantages of the present invention could be mentioned, but the advantages mentioned are sufficient to prove the novelty and utility of it. The following description and the accompanying drawings give an embodiment of the invention but are in no way limiting. Other embodiments are possible within the ambit and scope of the present invention. In the drawings.

DETAILED DESCRIPTION OF THE INVENTION

Figure 1:
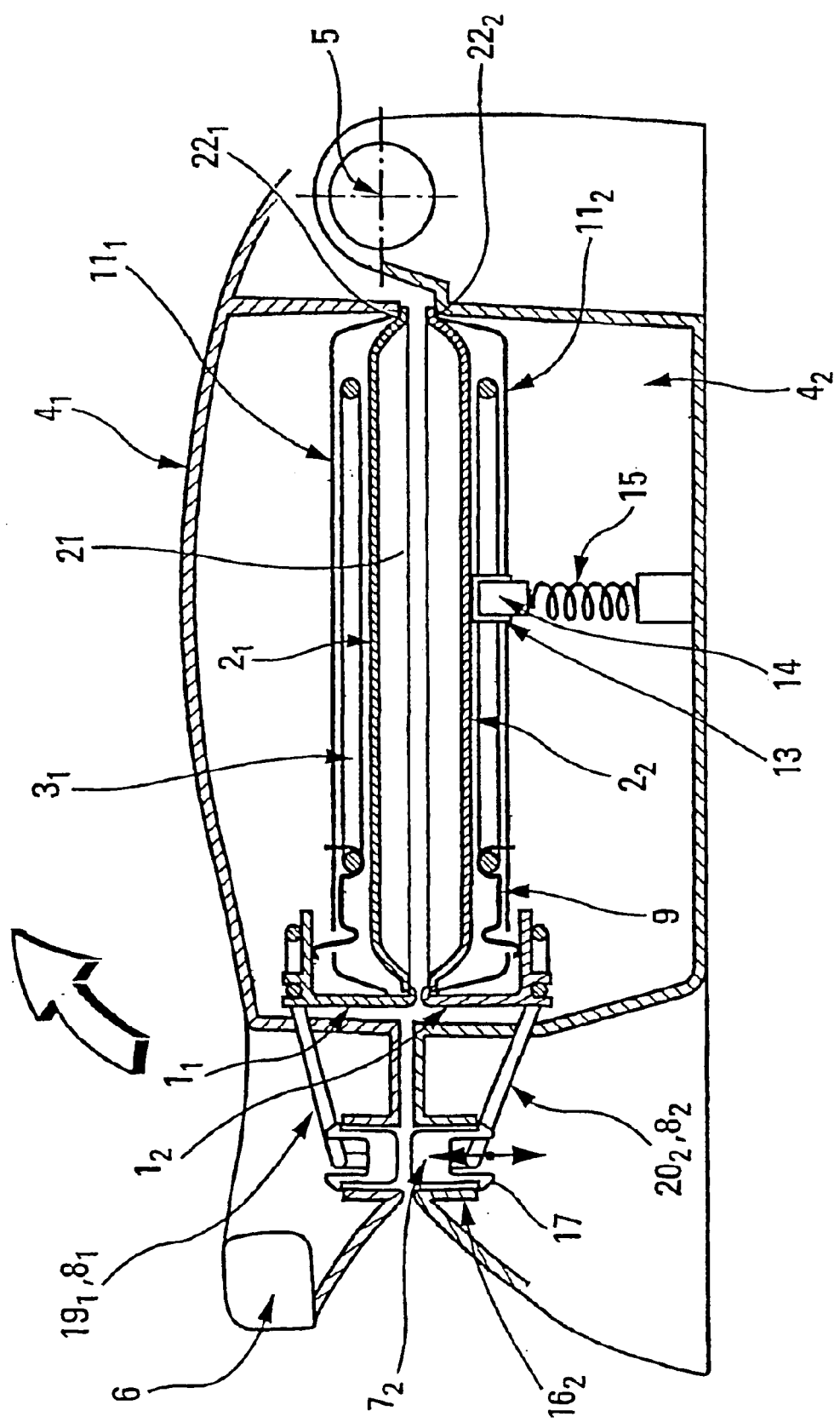
FIG. 1 is a section view of a cooking appliance equipped with a device of the present invention.
Figure 2:
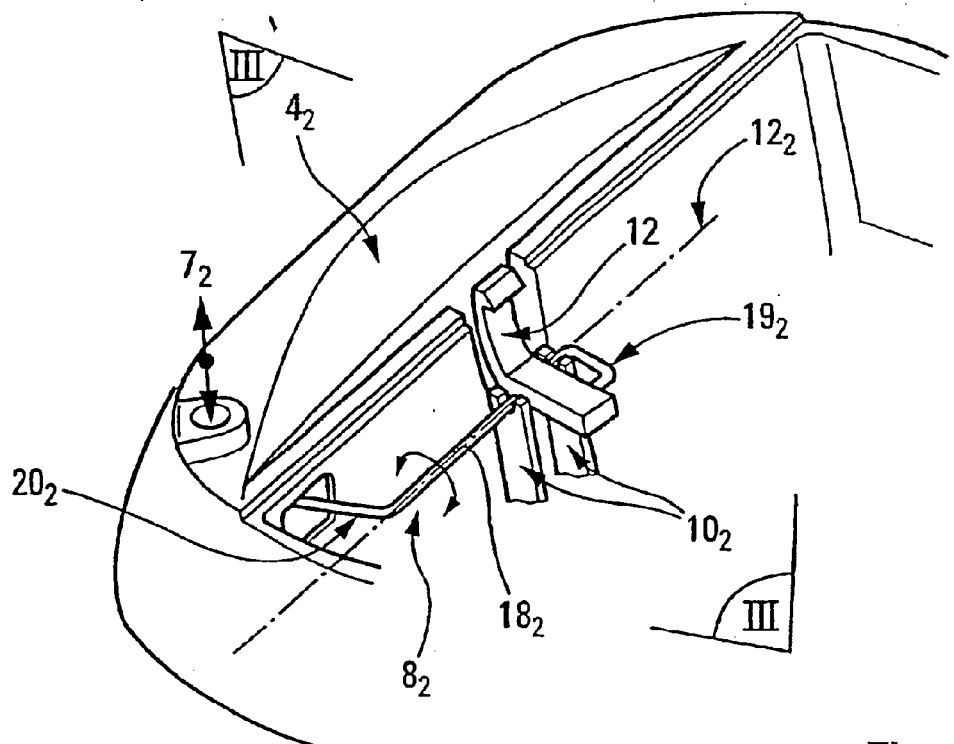
FIG. 2 is a fragmentary perspective view of a shell of the appliance shown in FIG. 1, without the corresponding hot plate and without the accessories other than the securing/releasing device of the invention.

In the embodiment shown in FIG. 1, the cooking appliance is a multi-purpose appliance of the toasted-sandwich/waffle/grill type, constituted by two shells $4_1$, $4_2$, each of which incorporates a heater element $3_1$, $3_2$, and also carries a removable hot plate $2_1$, $2_2$. Said shells 4 are hinged together about a hinge axis 5 so that said hot plates 2 carried by said shells define a space 21 between them that is suitable for receiving any food to be cooked.

For the balance of the description, reference numerals having subscripts identify elements of a respective shell. The subscript 1 refers to an element of the top shell $4_1$, and the subscript 2 refers to an element of the bottom shell $4_2$.

The top shell $4_1$ can be raised to access said space 21 by acting on the handle 6 to cause said shell $4_1$ to pivot about the hinge axis 5. Reflectors $11_1$, $11_2$ are disposed between the heater elements $3_1$, $3_2$ and the inside surfaces of the shells $4_1$, $4_2$, so as to reflect the heat and concentrate it on the space 21.

The appliance of the invention is provided with at least one control button 7 mounted to move relative to each shell 4 and with at least one lever 8, one portion of which co-operates with said button 7 and another portion 19 of which drives securing means 1 for the hot plate 2 when said button is pushed to act on said lever 8.

The sub-assemblies of the devices for securing/releasing or locking/unlocking the hot plates 2, although not labeled for the sake of clarity, are preferably identical in the bottom shell $4_2$ and in the top shell $4_1$.

Said control buttons 7 are mounted to move in translation in recesses 16 provided in respective ones of the shells 4 and allowing the button to move linearly and perpendicularly firstly to the axis of rotation 12 defined below, and secondly to the outside surface of the shell 4.

Preferably, said buttons are clipped into the front of the appliance in one of the corners situated in the vicinity of the opening in said appliance, such that, when the appliance is closed, said buttons are no longer accessible, and such that, when the appliance is open, said buttons are disposed at some distance from the hot plates 2 that they make it possible to release so that the user cannot touch the corresponding plate 2 when the user actuates one of said buttons 7.

Under each button 7, a lever 8 is mounted whose portion 20 comes into abutment against it. Each button 7 is guided by two ribs 17 on respective opposite sides.

The means for securing each hot plate 2 are constituted by a catch 1 that tilts about an axis 12, and said lever 8 has a central body 18 disposed along said axis 12, turning about said axis, and situated between the portions 20, 19 co-operating with said button 7 at one end and driving the catch 1 at the other end.

Said lever or transmission 8 is preferably a metal wire that is bent to form arms directed laterally relative to the rectilinear central body 18, and to constitute said portions 20, 19. Together with the portion of the metal wire that interconnects them and that constitutes the central portion 18, said two portions 20, 19 form a crank shaft assembly, each bent portion transmitting via the central body 18 to the other portion any turning moment that it receives by means of any force applied to the arm that constitutes it. The longer the arm, the further away from the body 18 forming the axis of rotation the point at which the force is applied lies, the larger the turning moment, and the easier the turning movement.

Each transmission or lever 8 is laid and clipped in bearings 10 integrated into the shell 4 via its central body 18 forming an axis of rotation. Each catch 1 is itself clipped to the bent portion 19 of said lever 8 which is associated with it.

As shown in the accompanying figures, said two portions 20, 19 of each lever 8 are the ends of said lever, but in another embodiment, the portion 19, for example, could be bent differently and the body 18 of the lever 8 could continue beyond said portion 19, and could be guided to turn about its own axis, i.e. about the axis 12, by another bearing situated on the other side of the catch 1 from the side on which the portion 20 is situated.

The appliance of the invention also includes at least one return spring 9 for each securing means 1, the spring returning the securing means to the locking position in which the corresponding plate 2 is locked so long as the corresponding control button 7 is not pushed, thereby holding the sub-assembly constituting the hot plate securing/releasing device of the invention in position and under stress.

The cooking appliance shown in the accompanying figures further includes a spring 15 under the bottom hot plate $2_2$ and on the same side as the heater element $3_2$, which spring raises said hot plate $2_2$ relative to the shell $4_2$ when the securing means $1_2$ are disengaged therefrom.

The spring 15 may be part of a regulation system made up of a probe 13, of a thermostat 14, and of said spring 15 which presses the probe 13 against the hot plate 2 when said hot plate is locked.

Figure 3:
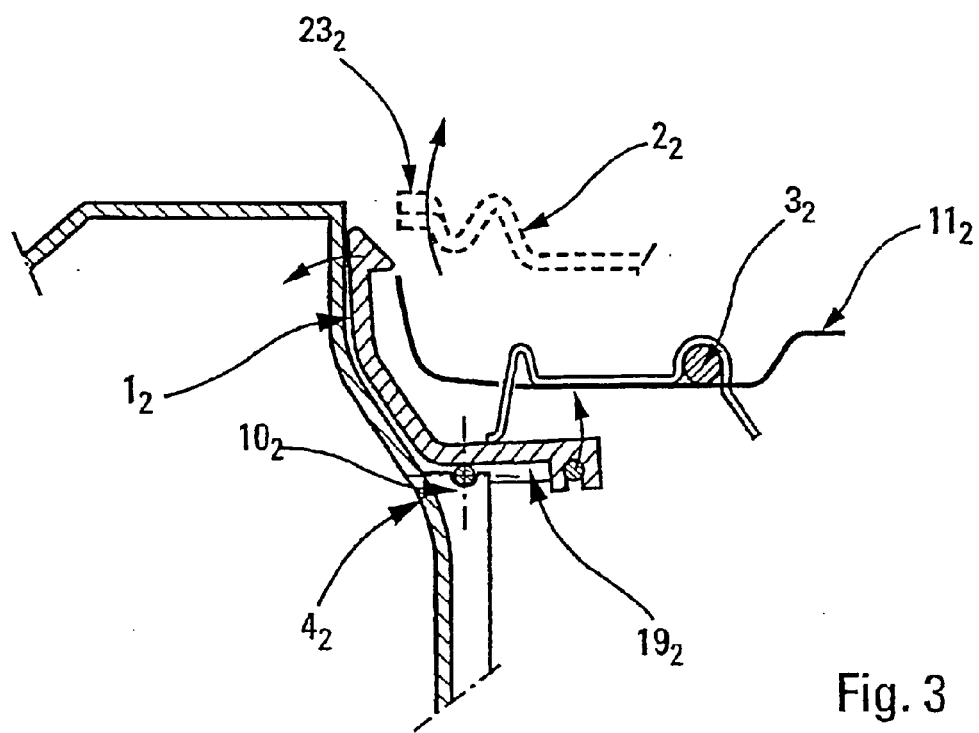
FIG. 3 is a section view on the plane III–III' of FIG. 2, showing the device in the unlocking/releasing position.
Figure 4:
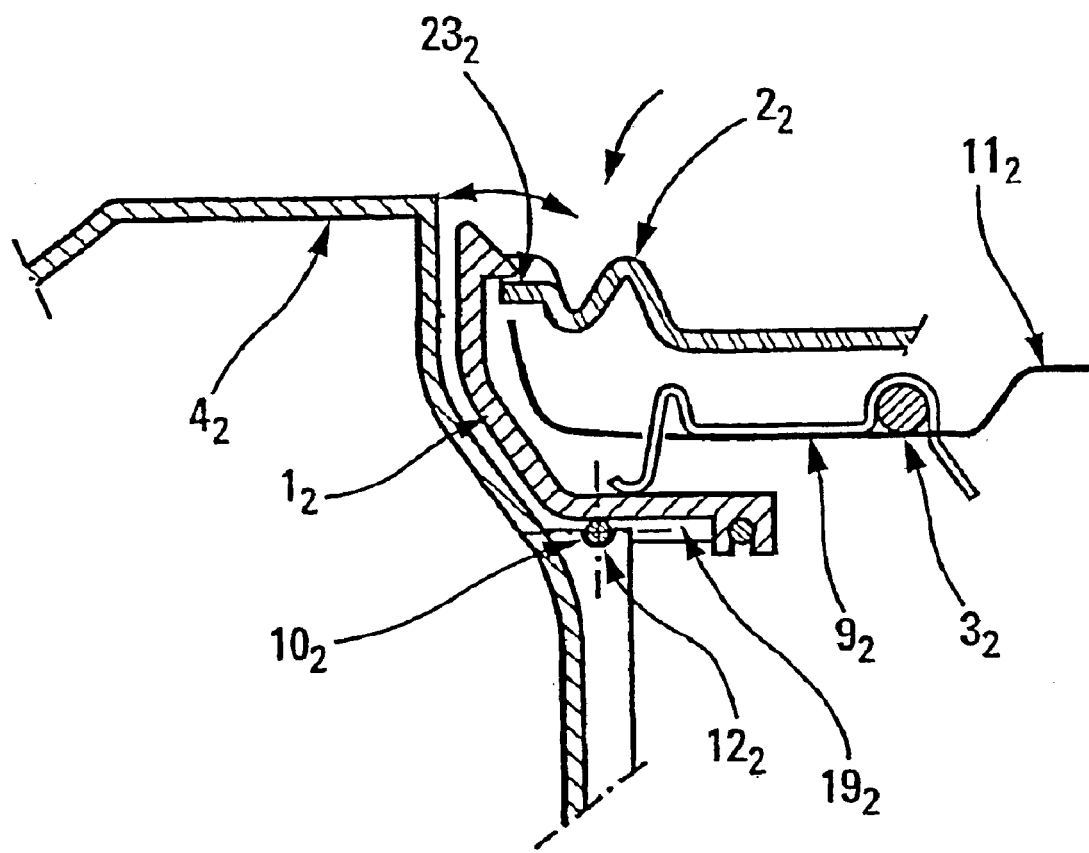
FIG. 4 is the same section view as the view in FIG. 3, with the device being in the securing/locking position.

In order to unlock each of the hot plates 2, it is necessary to press on the respective control button 7. By means of the transmission or lever 8 which then turns about the axis 12, each catch 1 retracts by tilting about its own axis to allow the corresponding hot plate 2 to pass, as shown in FIG. 3. The bottom plate $2_2$ rises under pressure from the probe 13 of the thermostat, and the top plate 21 comes free under its own weight.

In order to lock said cooking plates 2 again after they have been interchanged and/or cleaned, the lip 22 that constitutes the rim of each plate 2 or that may be a lug and that is situated opposite from the lip 23 that comes into abutment against a respective one of the catches 1 is slid into any compatible recess in the corresponding shell 4. The lip 23 of the plate 2 in question then abutting against the catch 1 causes said catch to retract by tilting back about the axis 12 in order to allow said plate to pass, as shown in FIG. 3. Once the plate 2 is in position, the catch 1, under drive from the return spring 9, returns to its initial position and locks the plate 2.

What is claimed is:

1. A cooking appliance comprising:
   at least one shell and at least one control button mounted to move relative to the shell;
   the shell incorporating a heater element and carrying a removable hot plate;
   at least one securing means for securing the hot plate to the heater element;
   said hot plate being releasable by moving said securing means;
   at least one lever mounted to turn about an axis;
   said lever having one portion co-operating with the control button, and another portion driving the securing means when the control button is pushed and acts on the lever.

2. The cooking appliance according to claim 1, wherein the lever has a central body disposed along the axis, turning about said axis, and situated between the portions co-operating with the control button at one end, and driving the securing means constituted by a catch mounted to tilt about the axis at the other end.

3. The cooking appliance according to claim 2, wherein the lever is a metal wire bent to constitute the portions co-operating with the control button at one end, and driving the catch at the other end; the two portions, together with the portion of the metal wire that interconnects them and constitutes the central body of the lever, forming a crankshaft assembly.

4. The cooking appliance according to claim 1, wherein the control button is mounted to move in translation in a recess provided in the shell and perpendicular to the outside surface of said shell.

5. The cooking appliance according to claim 1, wherein the two portions of the lever are ends of said lever.

6. The cooking appliance according to claim 1, wherein said appliance has two shells hinged together about an axis such that the removable hot plates carried by the shells define a space between them that is suitable for receiving food to be cooked.

7. The cooking appliance according to claim 1, wherein the control button is disposed at some distance from the hot plate which makes it possible to release, so that a user cannot touch the plate when said user actuates the control button.

8. The cooking appliance according to claim 1, wherein under the hot plate and on the same side as the heater element, said appliance further comprises a spring which raises the hot plate relative to the shell when the securing means are disengaged therefrom.

9. The cooking appliance according to claim 8, further comprising a regulation system including a probe, a thermostat and said spring which presses the probe against the hot plate.

10. The cooking appliance according to claim 1, further comprising at least one return spring for returning the securing means to a locking position in which the hot plate is locked, so long as the control button is not pushed.

* * * * *